Patented Nov. 18, 1947

2,431,119

UNITED STATES PATENT OFFICE 2,431,119

VEGETABLE PROTEIN - POLYPHOSPHATE UREA SOLUTION AND PROCESS OF PREPARING SAME

Artemy A. Horvath, Pittsburgh, Pa., assignor to Hall Laboratories, Inc., Pittsburgh, Pa., a corporation of Pennsylvania No Drawing. Application Apr. 8, 1944, Serial No. 530,238

3 Claims. (Cl. 260—112)

This invention relates to protein-polyphosphate coatings and solutions and process of preparing the same.

In my copending application, Serial No. 530,237, filed April 8, 1944, for "Protein-polyphosphate compound and process of preparing the same," I have disclosed and claimed a process of extracting protein from protein-containing solid material, the process resulting in a protein-polyphosphate compound which is useful for many purposes. The protein-polyphosphate compound produced according to my copending application may be used, for example, in the sizing of paper, the preparation of foods, and the preparation of glues and plastics. Briefly described, the copending application discloses extracting protein from solid materials such as cotton seed meal by the use of a dilute solution of sodium phosphate glass, the leaching operation being carried out at a pH above 5 and preferably below 9. The solution containing the protein is acidified to lower its pH, preferably to between 2 and 4.5, whereupon a protein-polyphosphate compound is precipitated. This protein-polyphosphate compound is separated from the solution, washed and dried.

My application Serial No. 530,237 also mentions cotton seed, soybeans or soybean meal, corn or corn meal, copra from which the oil has been extracted, other cereal grains and alfalfa as examples of other solid materials from which the protein-polyphosphate compound may be prepared.

The present invention deals with solutions and coatings made by dissolving the protein-polyphosphate compound. The preferred manner of producing the protein-polyphosphate compound used as starting material, according to the present invention, is by the extraction process disclosed in my application, Serial No. 530,237. However, the protein-polyphosphate compound may be made in other ways. For example, where the starting material is a solid, for instance cotton seed meal from which the oil has been extracted, the cotton seed meal may be leached with a dilute solution of a neutral salt. The extract containing the protein in solution may have added to it a small amount of a solution of an alkali-metal phosphate glass, such for example as the sodium phosphate glass commonly known as Graham's salt, having a molar ratio of $Na_2O$ to $P_2O_5$ of about 1:1 or the commercial sodium phosphate glasses. Commercial sodium phosphate glasses suitable for the invention have molar ratios of $Na_2O$ to $P_2O_5$ between approximately 1.1:1 and 1.4:1, but I may employ a solution of an alkali-metal phosphate glass having a molar ratio of alkali-metal oxide to $P_2O_5$ between about 0.9:1 and 1.7:1, the preferred ratio being about 1.0:1 to 1.4:1. In place of the alkali-metal phosphate glasses I may employ alkali-metal tripolyphosphate or alkali-metal trimetaphosphate. The alkali-metal phosphate glasses, the alkali-metal tripolyphosphates and the alkali-metal trimetaphosphates may be defined as "alkali-metal polyphosphates," each of these materials having a molar ratio of alkali-metal oxide to $P_2O_5$ of less than 2:1. The amount of any of these materials may be of the order of 15% based on the weight of the protein in solution. The addition of any suitable acid to the solution to lower its pH to about 2 to 4.5 causes the precipitation of a protein-polyphosphate compound. This precipitate is washed and is used as the starting material, according to the present invention.

There are many liquids which contain protein in solution or colloidal dispersion, among which may be mentioned whey, extracts of grains, liquids from breweries, and wash waters from dairies and slaughter houses. Any of these liquid sources of protein may be treated with phosphate glass, alkali-metal tripolyphosphate or trimetaphosphate at a pH between about 2 and 4.5, whereupon a protein-polyphosphate compound is formed which, after washing, may be employed according to the present invention.

One object of the present invention is to provide a composition adapted to form a protective coating on the surface of the human body in the treatment of cuts or burns, or in the formation of a "chemical glove" used for protecting the hands of the worker in various industries.

Generally speaking, the invention comprises forming a solution of the protein-polyphosphate compound, applying the solution to the surface to be protected, and thereafter either allowing the applied solution to dry to form the protective covering or to react with the surface to form the protective covering, or in some cases the applied solution is further treated to coagulate it and fix it to the surface.

There are four ways in which the protein-polyphosphate compound may be dissolved so as to form the solution which is to be applied to the surface to be protected. It may be dissolved in a urea solution. It may be dissolved in solutions of certain aluminum, chromium or iron salts. It may be dissolved in solutions of neutral salts, or it may be dissolved in solutions or alkaline materials.

I will refer first to a process in which the protein-polyphosphate compound is dissolved in urea, the urea solution is applied to the hand and the applied solution is coagulated to form a chemical glove for the protection of a workman. The protein-polyphosphate compound is dissolved in a urea solution and the solution is applied to the hands as by dipping them in the solution or brushing or spraying the solution on them. After the urea solution has been applied, the hands are dipped in or otherwise brought in contact with a dilute acid solution, as for example a vinegar solution or any other dilute acid solution. The acid coagulates a protein-polyphosphate-urea compound which forms the protective coating on the hands. Instead of using a dilute acid solution for coagulating the urea solution after it has been applied, I may use a concentrated heated solution of any neutral salt, suitable salts of this type being sodium chloride, sodium sulphate or ammonium sulphate. The protein-polyphosphate-urea solution may also be coagulated by addition of formaldehyde, thereby forming a protective coating of protein-polyphosphate-urea-formaldehyde.

Instead of dissolving the protein-polyphosphate compound in urea solutions, I may dissolve it in solutions of aluminum, chromium or iron salts, as for example a solution of an alum, aluminum sulphate, chromium chloride or ferric chloride. The salts of this type which are suitable for dissolving the protein-polyphosphate compound are the polyvalent metal salts which produce an acid reaction by hydrolysis. Although other polyvalent metal salts which produce an acid reaction by hydrolysis may be employed for dissolving the protein-polyphosphate compound, I prefer to employ the aluminum, chromium or iron salts falling within this category. Examples of the preferred salts are $FeCl_3$, $Al_2(SO_4)_3$, and $Al_2(SO_4)_3.K_2SO_4$. The solubility of protein-polyphosphate in solutions of aluminum salts was not to be expected because their pH (approximately 4) is the one found to be within the optimum range for the precipitation of protein by sodium phosphate glass. The solubility of protein-polyphosphate compound in aluminum salts also is contrary to the known behavior of proteins as such toward aluminum salts in that aluminum salts will precipitate protein from solution. The solution of protein-polyphosphate in the aluminum salt or other salt referred to is applied to the surface to be protected and is allowed to dry in order to form the protective covering, or if the applied solution is heated to about 75-80° C. the solution is coagulated to form the protective coating.

A third way of dissolving the protein-polyphosphate compound is to dissolve it in a concentrated solution of a neutral salt or a mixture of neutral salts. By "neutral salt" as used herein is meant any salt which when dissolved in water does not produce a markedly acid or markedly alkaline solution. Suitable neutral salts are the chlorides or sulphates of the alkali metals or the alkaline earth metals, or mixtures of such salts. Sea water is an example. Suitable specific salts are sodium chloride, sodium sulphate, ammonium chloride, ammonium sulphate, calcium chloride, barium chloride and magnesium sulphate. The solution is used in the same way as described in connection with the solution formed by the aluminum, chromium or iron salts. The protein-polyphosphate compound may be precipitated from the neutral salt solution by heating to 75–80° C.

The protein-polyphosphate compound may be dissolved in solutions having a pH above about 6. Such solutions may be made by the use of any suitable alkaline material, as for example, sodium carbonate, sodium hydroxide, ammonium hydroxide, trisodium or disodium phosphate or ammonium carbonate. Solutions of protein-polyphosphate in which the pH is above about 6 remain clear on boiling and, therefore, if it is desired to fix the solution after application to the surface it is necessary to lower the pH as by the addition of acid.

The invention is not limited to the preferred materials or embodiments, but may be otherwise embodied or practiced within the scope of the following claims.

I claim:

1. The process of preparing a protein-containing solution, which comprises dissolving a vegetable protein-polyphosphate compound in an aqueous urea solution.

2. The process of preparing a protein-containing product in solid form, which comprises dissolving a vegetable protein-polyphosphate compound in an aqueous urea solution and precipitating a protein-polyphosphate-urea compound by acidifying the solution.

3. A vegetable protein-polyphosphate compound in an aqueous urea solution.

ARTEMY A. HORVATH.

REFERENCES CITED

The following references are of record in the file of this patent:

UNITED STATES PATENTS

| Number | Name | Date |
|---|---|---|
| 1,400,381 | Schwartz | Dec. 31, 1921 |
| 1,725,805 | Landecker | Aug. 27, 1929 |
| 1,939,738 | Tuttle | Dec. 19, 1933 |
| 2,064,387 | Schwartz | Dec. 15, 1936 |
| 2,167,202 | Gould et al. | July 25, 1939 |
| 2,182,357 | Schwartz | Dec. 5, 1939 |
| 2,204,535 | Gould et al. | June 11, 1940 |
| 2,215,137 | Schwartz | Sept. 17, 1940 |
| 2,241,868 | Reimann | May 13, 1941 |
| 2,322,565 | Cole | June 22, 1943 |

FOREIGN PATENTS

| Number | Country | Date |
|---|---|---|
| 467,704 | Great Britain | June 22, 1937 |
| 467,812 | Great Britain | June 22, 1937 |

Certificate of Correction

Patent No. 2,431,119.                                                                November 18, 1947.

ARTEMY A. HORVATH

It is hereby certified that error appears in the printed specification of the above numbered patent requiring correction as follows: Column 2, line 53, for the words "solutions or" read *solutions of*; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*